United States Patent Office 3,325,454
Patented June 13, 1967

3,325,454
PREPARATION OF POLYESTERS
Itaru Nakamura, Isamu Tamai, and Kenji Nukushina, all of Mishima-shi, Shizuoka-ken, Japan, assignors to Toyo Rayon Kabushiki Kaisha, Tokyo, Japan, a corporation of Japan
No Drawing. Filed May 22, 1963, Ser. No. 286,438
Claims priority, application Japan, May 29, 1962, 37/21,995; July 19, 1962, 37/30,715; Aug. 10, 1962, 37/34,328
4 Claims. (Cl. 260—75)

This invention relates to a process for preparing polyesters and in particular to a process for preparing polyethylene terephthalate or polyesters which are predominantly polyethylene terephthalate.

It is well known to prepare polyethylene terephthalate by directly esterifying terephthalic acid with ethylene glycol followed by the polycondensation of the product thereof. It is also known in this case that when the conventional catalysts such as the oxides of antimony and lead are used alone the softening point of the polyethylene terephthalate obtained is lowered because of the content therein of a large amount of ether bonds formed by the dehydration reaction between the glycols during the esterification reaction, and hence the degradation of the quality of the product is pronounced.

For the purpose of preventing the lowering of the softening point of polyethylene terephthalate, proposals have heretofore been made to conduct the esterification reaction in the presence of an alkaline substance such as the inorganic alkalis (British Patent No. 777,628), the alkali metal salts of terephthalic acid (British Patent No. 782,036), the alkaline earth metal salts of terephthalic acid (British Patent No. 835,442) or the tertiary amines (Belgian Patent No. 854,147).

However, owing to the fact that the alkaline substances, such as mentioned hereinabove, are present in the formed polymer in a dispersed state without having dissolved therein they frequently form aggregates and hence tend to adversely affect the process of fiber of film formation.

It is therefore an important object of this invention to provide an improved process whereby the formation of the aforementioned ether bonds is prevented and polyethylene terephthalate of high softening point or polyesters which consist preponderantly of such a polyethylene terephthalate are prepared.

Other objects and advantages of the invention will become apparent from the description which follows.

The foregoing objects of the present invention are attained by a process which is characterized in that in a process for preparing polyethylene terephthalate by directly esterifying terephthalic acid with ethylene glycol, followed by the polycondensation of the product thereof, a quaternary ammonium compound in an amount of 0.0005–1.0 mol percent, based on the acid component in the reaction system, is added to the system prior to the completion of said esterification reaction, after which the esterification and polycondensation reactions are completed.

The quaternary ammonium compounds used in the process of this invention include those having the following general formula

wherein each of $R_1$, $R_2$, $R_3$ and $R_4$ is either (a) a group represented by the general formula

A—R— wherein R is an alkylene of 1–10 carbon atoms, arylene of 6–16 carbon atoms, cycloalkylene of 6–16 carbon atoms or alkylarylene of 6–16 carbon atoms, and A is hydrogen or hydroxy; (b) a group represented by the general formula H—R—O (where R is as defined above); or (c) a group represented by the general formula H—R—CO—O— (where R is as defined above); and X is hydroxy, chlorine or bromine.

The hereinabove defined quaternary ammonium compounds in which each of the foregoing $R_1$, $R_2$, $R_3$ and $R_4$ is an alkyl of 1–10 carbon atoms such as methyl, ethyl, propyl, butyl, isobutyl, amyl, hexyl, octyl, nonyl, and decyl; an aryl of 6–10 carbon atoms such as phenyl, tolyl and naphthyl; a lower alkyl substituted with phenyl, such as cyclohexyl, benzyl and diphenyl methyl; a lower alkyl substituted with hydroxy, such as oxyethyl; a lower alkyl substituted with a lower alkoxy, such as methoxyethyl; or a lower alkyl substituted with a lower acyloxy, such as acetoxyethyl, are readily available and hence can be conveniently used in the process of this invention.

Preferred quaternary ammonium compounds are exemplified by the quaternary ammonium hydroxides such as tetrabutylammonium hydroxide, tetraethylammonium hydroxide, trimethylbenzylammonium hydroxide, triethylbenzylammonium hydroxide, tributylbenzylammonium hydroxide, tribenzylmethylammonium hydroxide, tribenzylethylammonium hydroxide, tribenzylbutylammonium hydroxide, tetrabenzylammonium hydroxide, tribenzylphenylammonium hydroxide, trimethyloxyethylammonium hydroxide, triethyloxyethylammonium hydroxide, tributyloxyethylammonium hydroxide, triethylmethoxyethylammonium hydroxide, triethylacetoxyethylammonium hydroxide, tetraacetoxyethylammonium hydroxide, dimethyldibenzylammonium hydroxide and dimethylbisoxyethylammonium hydroxide. Additionally, the quaternary ammonium halides such as tetraethylammonium chloride, tetrabutylammonium chloride and trimethyl (β-methoxyethyl) ammonium bromide are another group of quaternary ammonium compounds which can be used in the process of the present invention.

According to the process of this invention, these quaternary ammonium compounds must be added to the reaction system in an amount of 0.005 to 1 mol percent, preferably 0.01 to 0.2 mol percent, based on the acid component of the system, prior to completion of the esterification of the reaction system. The quaternary ammonium compound can be added to the reaction system either by using the compound as such or as an aqueous solution, alcoholic solution, glycol solution or a solution of other solvents.

The reaction can be carried out by esterifying terephthalic acid and ethylene glycol at a temperature above the boiling point of the latter and a pressure above the vapor pressure of ethylene glycol at the reaction temperature and then effecting the polycondensation reaction reaction under a high vacuum of the resultant bis (β-hydroxyethyl) terephthalate and its lower polymers at a temperature which not only is below 300° C. but also below the melting point of polyester.

Since the polyethylene terephthalate obtained by the process of this invention not only has a normal softening point but also the quaternary ammonium compound added does not substantially get mixed into the polyethylene terephthalate as an insoluble component, its processability is outstanding.

The process of this invention can be applied to the esterification reaction of a reaction system in which, of the total starting materials, more than 85% consists of terephthalic acid and ethylene glycol and less than 15% consists of other third components.

The term "third components," as used herein, is meant to be a generic term applying to the compounds having ester-forming capacity, such as isophthalic acid, p-oxybenzoic acid, sodium sulfoisophthalic acid, adipic acid, sebacic acid, diethylene glycol and pentaerythritol; additives such as titanium dioxide, carbon black, phthalocyanine and Indanthrene pigments; and polymeric materials other than polyesters.

In addition, according to the process of this invention, by using the quaternary ammonium salts with a metal-containing catalyst such as cobalt chloride, manganese acetate, calcium acetate, lead acetate and antimony oxide, and a coloration inhibitor such as phosphoric acid, phosphorous acid and triphenyl phosphate, particularly desirable results are obtained, i.e., polyesters of high softening point whose color tone is good can be produced with a short reaction time.

For a still clearer understanding of the invention, the following examples are given, it being understood that these examples are intended to be merely illustrative of the invention and not in limitation thereof. Unless otherwise specified, all parts are by weight.

Example 1

Eighty parts of terephthalic acid, 120 parts of ethylene glycol, 0.02 part of cobalt chloride, 0.04 part of phosphorous acid, 0.02 part of antimony oxide and 0.8 part of a 10% aqueous solution of tetrabutylammonium hydroxide were charged to a reactor equipped with a rectifying column, following which the mixture was heated and reacted at atmospheric pressure. The polycondensation of the reaction mixture was then carried out under a high vacuum of less than 1 mm. Hg.

The so obtained polyester had a softening point of 258.5° C. and its intrinsic viscosity in a 6:4 phenol-tetrachloroethane solvent at 25° C. was 0.58.

When the same procedure as above was followed except that tetrabutylammonium hydroxide was not added, a polyester of a softening point of 244° C. and an intrinsic viscosity of 0.50 was obtained.

Example 2

An autoclave equipped with a rectifying column was charged with 40 parts of terephthalic acid, 20 parts of ethylene glycol, 0.01 part of cobalt chloride, 0.02 part of phosphoric acid, 0.01 part of antimony oxide and 0.3 part of a 10% aqueous solution of tetraethylammonium hydroxide, and the esterification reaction was carried out by heating for 2 hours at 230° C. under a pressure of 2 kg./cm.$^2$ gauge.

The reaction product was then transferred to a polycondensation autoclave, wherein the polycondensation reaction was carried out for 4 hours under a high vacuum of 0.5 mm. Hg.

The resultant polymer had a softening point of 259.5° C. and an intrinsic viscosity in orthochlorophenol at 25° C. of 0.63 and was of excellent color tone.

With the exception that 0.08 part of caustic soda was used in lieu of the 0.3 part of an aqueous solution of tetraethylammonium hydroxide, procedures substantially as above were followed, whereby was obtained a polyester having a softening point of 260.2° C. and an intrinsic viscosity of 0.65 measured in orthochlorophenol at 25° C. This polyester, however, not withstanding its having been quenched thoroughly at the time of molding for preventing its devitrification by means of crystallization, exhibited numerous white spots. A large number of these spotty portions was collected, and washed with orthochlorophenol to remove the adhering polymeric material. The solic residue remaining was soluble in water and a 3% aqueous caustic soda solution but was not soluble in 1 N-hydrochloric acid. Again, when this residue was dissolved in water and then 1 N-hydrochloric acid was added, crystals were separated. Further, the infrared spectrum of the residue showed a considerable agreement with that of sodium terephthalate. These facts indicated that the principal component of the white spot portions of the polyester was sodium terephthalate.

Example 3

A reactor equipped with a rectifying column was charged with 80 parts of terephthalic acid, 120 parts of ethylene glycol, 0.02 part of cobalt acetate, 0.02 part of antimony oxide, 0.1 part of trihexyl phosphite and 0.03 part of tetraethylammonium chloride, and the mixture was reacted by heating for 8 hours at the boiling point of the reactants and under atmospheric pressure. The clear, esterified product obtained was then transferred to a polycondensation reaction tube and the polycondensation reaction was carried out by heating said product for 5 hours at 275° C. under a vacuum of 1 mm. Hg. The so obtained polymer whose color tone was colorless and clear had a softening point of 258.8° C. and an intrinsic viscosity in a 6:4 phenol-tetrachloroethane mixed solvent at 25° C. of 0.60.

Substantially the same procedures as described above were repeated except that tetraethylammonium chloride was not added to the reaction system. The intrinsic viscosity of the resulting polymer was 0.55 and its softening point was 250.5° C.

Example 4

Eighty parts of terephthalic acid, 40 parts of ethylene glycol, 0.02 part of manganese acetate and 0.08 part of triphenyl phosphate, 0.05 part of tetrabutylammonium chloride were charged to an autoclave equipped with a rectifying tower and reacted for 3 hours at 320° C. and a pressure of 2 kg./cm.$^2$ gauge. The contents were then transferred to an autoclave for use in polycondensation and then, after adding 0.02 part of antimony oxide and 3 parts of a ethylene glycol slurry containing 15% titanium dioxide, the polycondensation reaction was carried out for 6 hours under a vacuum of 1 mm. Hg. The color tone of the resultant polymer was good, its softening point was 260.0° C. and its intrinsic viscosity, as measured by the procedure described in Example 1, was 0.64.

Substantially the same procedures, as described above, was repeated. The polymer so obtained had an intrinsic viscosity of 0.66 and a softening point of 254.0° C.

Example 5

Eighty parts of terephthalic acid, 120 parts of ethylene glycol, 0.02 part of cobalt acetate, 0.015 part of calcium acetate, 0.02 part of antimony oxide, 0.1 part of triphenyl phosphite and 0.05 part of trimethyl (β-methoxyethyl) ammonium bromide were charged to a reactor equipped with a rectifying column and then heated and reacted for 7.5 hours at atmospheric pressure, the water formed being distilled off. The esterification product obtained was then transferred to a polycondensation reactor, where it was heated for 5 hours at 275° C. under a vacuum of 1 mm. Hg to effect the polycondensation reaction. The intrinsic viscosity of the polymer obtained was 0.58 and its softening point was 258.4° C.

Example 6

The experiment was carried out under identical conditions as in Example 4 except that instead of the trimethyl (β-methoxyethyl) ammonium bromide 0.05 part of trimethylphenylammonium chloride was added. The so obtained polymer had an intrinsic viscosity of 0.57 and a softening point of 258.7° C.

Example 7

Eighty parts of terephthalic acid, 120 parts of ethylene glycol, 0.02 part of manganese acetate, 0.04 part of phosphorous acid, 0.02 part of antimony oxide and 1.0 part of 10% methanol solution of trimethylbenzylammonium hydroxide were charged to a reactor equipped with a rectifying column, heated and reacted at atmospheric pressure and thereafter the polycondensation reaction of the reaction product obtained was effected under a high vacuum of 1 mm. Hg.

The obtained polyester had a softening point of 258.6° C. and an intrinsic viscosity in a 6:4 phenol-tetrachloroethane solvent at 25° C. of 0.58.

Except that trimethylbenzylammonium hydroxide was not added, otherwise the procedure substantially as described above were repeated to yield a polymer having a softening point of 245° C. and an intrinsic viscosity of 0.52.

*Example 8*

Eighty parts of terephthalic acid, 50 parts of ethylene glycol, 0.02 part of cobalt chloride, 0.04 part of phosphorous acid, 0.02 part of antimony oxide and 0.8 part of a 5% ethanol solution of trimethyl (β-oxyethyl) ammonium hydroxide were charged to an autoclave equipped with a rectifying column and heated for 2 hours at 230° C. and pressure of 2 kg./cm.² gauge to effect the esterification reaction. The reactants were then transferred to a polycondensation autoclave where the polycondensation reaction was carried out for 4 hours under a high vacuum of 0.5 mm. Hg.

The so obtained polymer possessed a good color tone, and its softening point was 259.0° C. and intrinsic viscosity in orthochlorophenol at 25° C. was 0.64.

What is claimed is:

1. In a process for preparing polyethylene terephthalate by directly esterifying terephthalic acid with ethylene glycol in the presence of a metal-containing catalyst selected from the group consisting of cobalt chloride, manganese acetate, calcium acetate, lead acetate, and antimony oxide followed by effecting the polycondensation of the esterified product, the improvement which comprises (1) adding to the reaction system prior to the completion of said esterification reaction in an amount of 0.0005 to 1.0 mol percent, based on the acid component in said reaction system, a quaternary ammonium compound of the general formula

wherein each of $R_1$, $R_2$, $R_3$ and $R_4$ is a group selected from the class consisting of (a) a group represented by the general formula A—R— wherein R is a bivalent hydrocarbon group selected from the class consisting of an alklene of 1–10 carbon atoms, an arylene of 6–16 carbon atoms, a cycloalkylene of 6–16 carbon atoms and an alkylarylene of 6–16 carbon atoms; and A is hydrogen or hydroxy; (b) a group represented by the general formula H—R—O where R is as defined above; and (c) a group represented by the general formula H—R—CO—O where R is as defined above; and X is a member selected from the class consisting of hydroxy, chlorine and bromine; and (2) thereafter completing the esterification and polycondensation reactions.

2. In a process for preparing polyethylene terephathalate by directly esterifying terephthalic acid with ethylene glycol in the presence of a metal-containing catalyst selected from the group consisting of cobalt chloride, manganese acetate, calcium acetate, lead acetate, and antimony oxide followed by effecting the polycondensation of the esterified product, the improvement which comprises (1) adding to the reaction system prior to the completion of said esterification reaction in an amount of 0.0005 to 1.0 mol percent, based on the acid component in said reaction system, a quaternary ammonium compound of the general formula

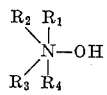

wherein each of $R_1$, $R_2$, $R_3$ and $R_4$ is a group selected from the class consisting of (a) a group represented by the general formula A—R— wherein R is a bivalent hydrocarbon group selected from the class consisting of an alkylene of 1–10 carbon atoms, an arylene of 6–16 carbon atoms, a cycloalkylene of 6–16 carbon atoms and an alkylarylene of 6–16 carbon atoms; and A is hydrogen or hydroxy; (b) a group represented by the general formula H—R—O where R is as defined above; and (c) a group represented by the general formula H—R—CO—O (where R is as defined above); and (2) thereafter completing the esterification and polycondensation reactions.

3. The process according to claim 2 in which said quaternary ammonium hydroxide is added to the reaction system in an amount of 0.01 to 0.2 mol percent, based on the acid component in said system.

4. The process according to claim 3 wherein said quaternary ammonium hydroxide is tetraalkylammonium hydroxide.

References Cited

UNITED STATES PATENTS 3,039,998  6/1962  Boerma _____ 260—75
3,245,959  4/1966  Roeser _____ 260—75

WILLIAM H. SHORT, *Primary Examiner.*

SAMUEL H. BLECH, R. T. LYON, *Assistant Examiners.*